Feb. 7, 1939.  F. E. STAHL  2,146,453
TRACTION DEVICE
Filed Jan. 19, 1938   2 Sheets-Sheet 1

Inventor,
FRANK E. STAHL
by J. Wm. Ellis
Attorney.

Feb. 7, 1939.  F. E. STAHL  2,146,453
TRACTION DEVICE
Filed Jan. 19, 1938    2 Sheets-Sheet 2

Inventor,
FRANK E. STAHL
by J. Wm. Ellis
Attorney

Patented Feb. 7, 1939

2,146,453

UNITED STATES PATENT OFFICE 2,146,453

TRACTION DEVICE

Frank E. Stahl, Tonawanda, N. Y.; Lillie M. Stahl administratrix of said Frank E. Stahl, deceased Application January 19, 1938, Serial No. 185,688

4 Claims. (Cl. 152—233)

My invention relates in general to traction devices, and more particularly to emergency anti-skid devices as applied to the wheels and tires of motor vehicles.

It is well known to those skilled in the art that present day emergency anti-skid devices can be used only upon wheels having spokes or openings through which the strap of the emergency device may be passed. When such devices are being used, the looseness in the device is taken up, and the engagement of the strap with the spoke or side of the strap opening prevents further movement, around the periphery of the tire, with the result that the cross chains of the device are brought into engagement with the surface of the tire at substantially the same place, each time the chains contact with the pavement, thus tending to injure the tire if the chains are kept constantly in use.

The principal object of my invention has been to overcome the disadvantages above pointed out and to provide means whereby emergency anti-skid chains may be fastened in place so that a limited amount of creeping of the chains around the tire may occur.

Another object has been to provide a device of this nature which may be used in connection with disc wheels.

Moreover, my invention may be attached to any wheel by means of clips slipped under the tire and between the tire and the tire rim, thus making it unnecessary to permanently fasten the device in place upon any part of the wheel as, for instance, by means of screws or bolts.

Furthermore, my device is of such a nature that the attaching rings thereof may be conveniently and easily attached to or detached from any wheel, whether of the disc or artillery type.

Moreover, the emergency anti-skid chains may, likewise, be easily and quickly secured in place when my device is used upon any type of wheel.

The above objects and advantages have been accomplished by the device shown in the accompanying drawings, of which:

Figure 1:
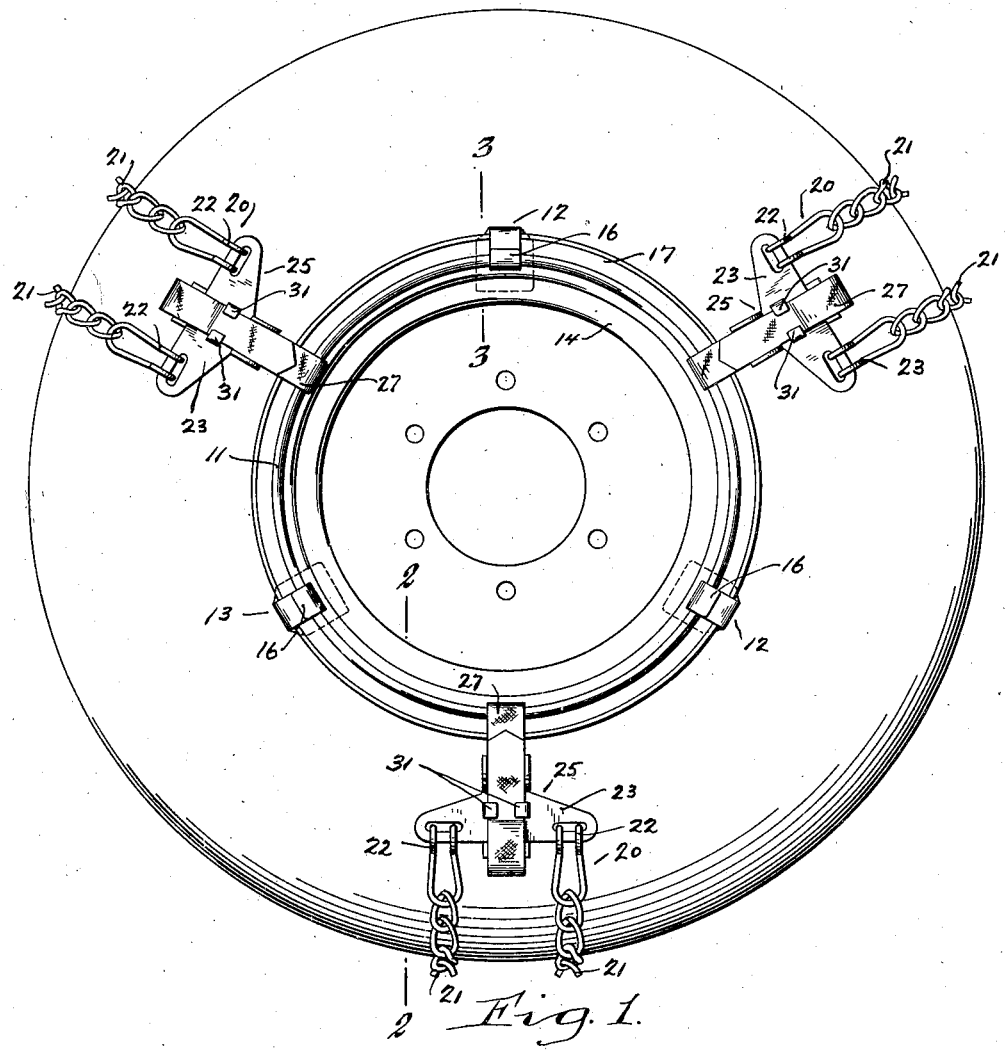
Fig. 1 is a side elevation of my complete device, shown applied to a wheel and tire.
Figure 5:
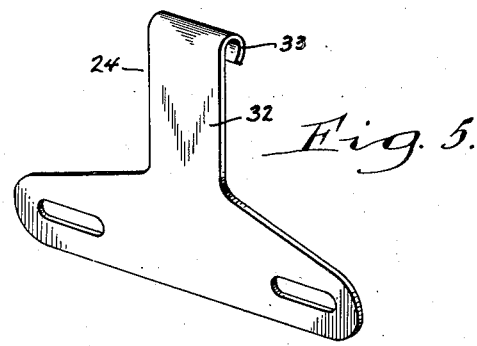
Fig. 5 is an enlarged, perspective view of one of the plates of the emergency cross chains.
Figure 2:
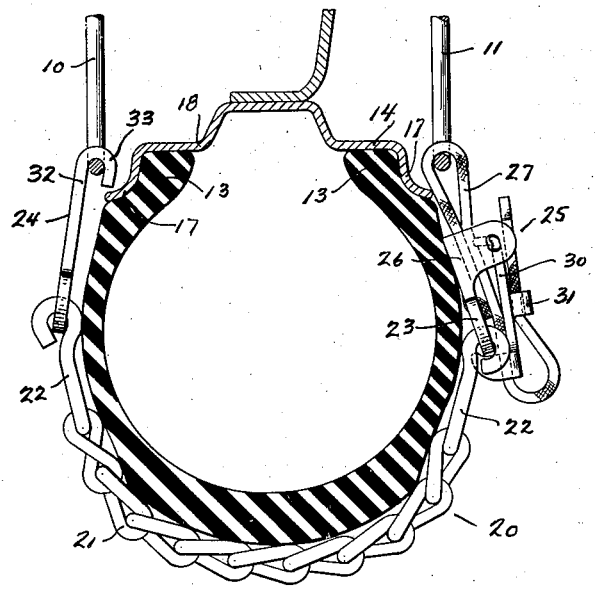
Fig. 2 is an enlarged, transverse, sectional elevation taken on line 2—2 of Fig. 1, showing one of the anti-skid devices in elevation.
Figure 4:
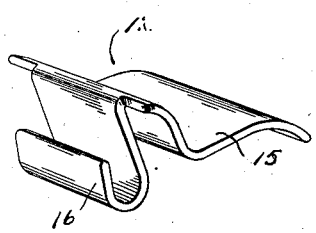
Fig. 4 is an enlarged, perspective view of one of the holding clips.
Figure 3:
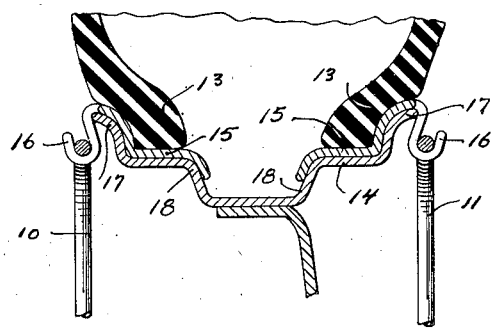
Fig. 3 is an enlarged, transverse, sectional elevation taken on line 3—3 of Fig. 1, showing the holding clips in place.

My device comprises in general two attaching rings 10 and 11 arranged one at each side of the wheel. These rings are annular in form and are made of wire, preferably of circular cross-section, joined together so as to make an endless ring. A plurality of holding clips 12 (see particularly Figs. 3 and 4) are equi-distantly spaced around the tire on each side thereof and are arranged between the tire bead 13 and the tire rim 14 which, in the form illustrated, also forms the felloe of the wheel. Each of these clips is provided with a body part 15 which is made to conform to the shape of the flange 17 and a part of the base 18 of the tire rim. Each clip is also provided with a hook portion 16. The body part 15 of the clip is preferably wider than the hook portion thereof so that sufficient bearing may be had between the rim and the tire bead where the body portion is disposed when in use. The hook portion is so formed that when the body part 15 of the clip is held in place between the inflated tire and the rim, it will extend toward the center of the wheel for engagement with the attaching ring which will be securely held in concentric manner by such hook portions, by which construction the annular attaching rings 10 and 11 may be quickly and conveniently attached to or detached from the wheel. By such construction, all drilling, tapping, or other means for permanently fastening the devices to the wheel are obviated. By providing three holding clips, the attaching rings are securely held in concentric relation with the wheel and in such manner as to provide ample exposed portions of the ring between the clips for permitting the creeping of the emergency anti-skid devices, to be hereinafter described.

Since three holding clips are employed to carry the attaching rings, three emergency anti-skid devices 20 are preferably employed. Each of these anti-skid devices is of the emergency type having preferably two cross chains 21 which are fastened at one of their ends by means of hooks 22 to a fastening plate 23. Likewise, the opposite ends of the chains 21 are fastened by means of similar hooks 22 to a cross chain plate 24. The fastening plate 23 is a part of a clamping device 25 which comprises a buckle member 26 and a strap 27. The strap has one of its ends fastened to the buckle member and the other end passed around the front attaching ring 11 and under the clamping lever 30 of the fastening means where it is secured in place by such clamping means, the extreme end being turned back and threaded under clips 31 carried by the buckle member. The cross chain plate 24 at the opposite end of the emergency device is provided with an outwardly extending arm 32 which has a hook 33 at its extreme outer end. This hook 33 is designed to engage the rear attaching ring 10 before the strap is placed in engagement with the front attaching ring 11.

When my device is to be placed in use, the tire is deflated sufficiently so as to permit the body parts 15 of the holding clips 12 to be slipped underneath the bead 13 of the tire and between it and the rim 14 of the wheel. As hereinbefore indicated, it is preferable to use three holding clips 12, and these are applied in the same manner as just above described and are equi-distantly spaced. The annular ring 10 or 11 is, of course, engaged with the hook portions 19 of the clips at some time during the assembling of the clips. It is preferable, however, to place the clips all on one side of the center line of the wheel and then engage the rings with the hook portions of the clips, after which the clips may be moved around under the tire and on top of the rim to the desired position before the tire is inflated. After the clips have been properly positioned, the tire is inflated and the clips will thereby be firmly held in place, together with the rings which they carry. The attaching rings now being in position, the device is ready to receive the emergency anti-skid chains when needed. When the anti-skid chains are to be used, one of them is placed between two adjacent holding clips and is secured to the attaching rings 10 and 11. The cross chain plate 24 of each emergency chain has its hooked end 33 engaged with the back ring 10, the cross chains 21 are brought into engagement with the periphery of the tire, and the strap 27 of the clamping device is threaded under and around the front attaching ring 11. The strap is then passed under the clamping lever 30 of the fastening means, whereupon it is secured in place by such lever, and the extreme end is then returned and passed under the clips 31 of the fastening means. When the device is now placed in use, the chains 21 carried by the emergency anti-skid devices are free to creep about the tire a limited amount. Obviously, when it is desired to remove the emergency anti-skid devices, the straps are released from the fastening means, whereupon the cross chain plates are free to be detached from the back attaching ring 10. The attaching rings 10 and 11, when in place, may be allowed to remain in position at all times or during certain seasons of the year when the emergency anti-skid devices might be needed. If desired, however, they may be easily removed from the wheel during the seasons when the traction offered by the emergency anti-skid chains is not needed. Obviously, to remove the rings 10 and 11, it is only necessary to deflate the tire, after which the holding clips 12 and the rings may be easily disassembled.

Obviously, some modifications of the details herein shown and described may be made without departing from the spirit of my invention or the scope of the appended claims, and I do not, therefore, wish to be limited to the exact embodiment herein shown and described, the form shown being merely a preferred embodiment thereof.

Having thus described my invention, what I claim is:

1. In a traction device, the combination with a tire and a tire rim, of a plurality of holding clips carried between the tire and the rim and arranged in predetermined, fixed relation with each other, an annular ring arranged at each side of the wheel and supported by the clips, and a plurality of emergency anti-skid devices detachably secured to the annular rings.

2. In a traction device, the combination with a tire and a tire rim, of a plurality of holding clips detachably carried between the tire and the rim and arranged in predetermined, fixed relation with each other, an annular ring arranged at each side of the wheel and supported by the clips, and a plurality of emergency anti-skid devices detachably secured to the annular rings.

3. In a traction device, the combination with a tire and a tire rim, of a plurality of holding clips, each having a body portion and a hook portion, said body portion being held by and between the tire and the tire rim, an annular ring disposed at each side of the rim and engageable with the hook portions of the clips, and a plurality of emergency anti-skid devices detachably secured to the annular rings.

4. In a traction device, the combination with a tire and a tire rim, of a plurality of holding clips carried between the tire and the rim and arranged in predetermined, fixed relation with each other, an annular ring arranged at each side of the wheel and supported by the clips, a plurality of emergency anti-skid devices detachably secured to the annular rings, each comprising a cross chain plate and fastening means, said cross chain plate having a hook for engagement with one of the annular rings, and said fastening means being engageable with the other annular ring.

FRANK E. STAHL.